UNITED STATES PATENT OFFICE.

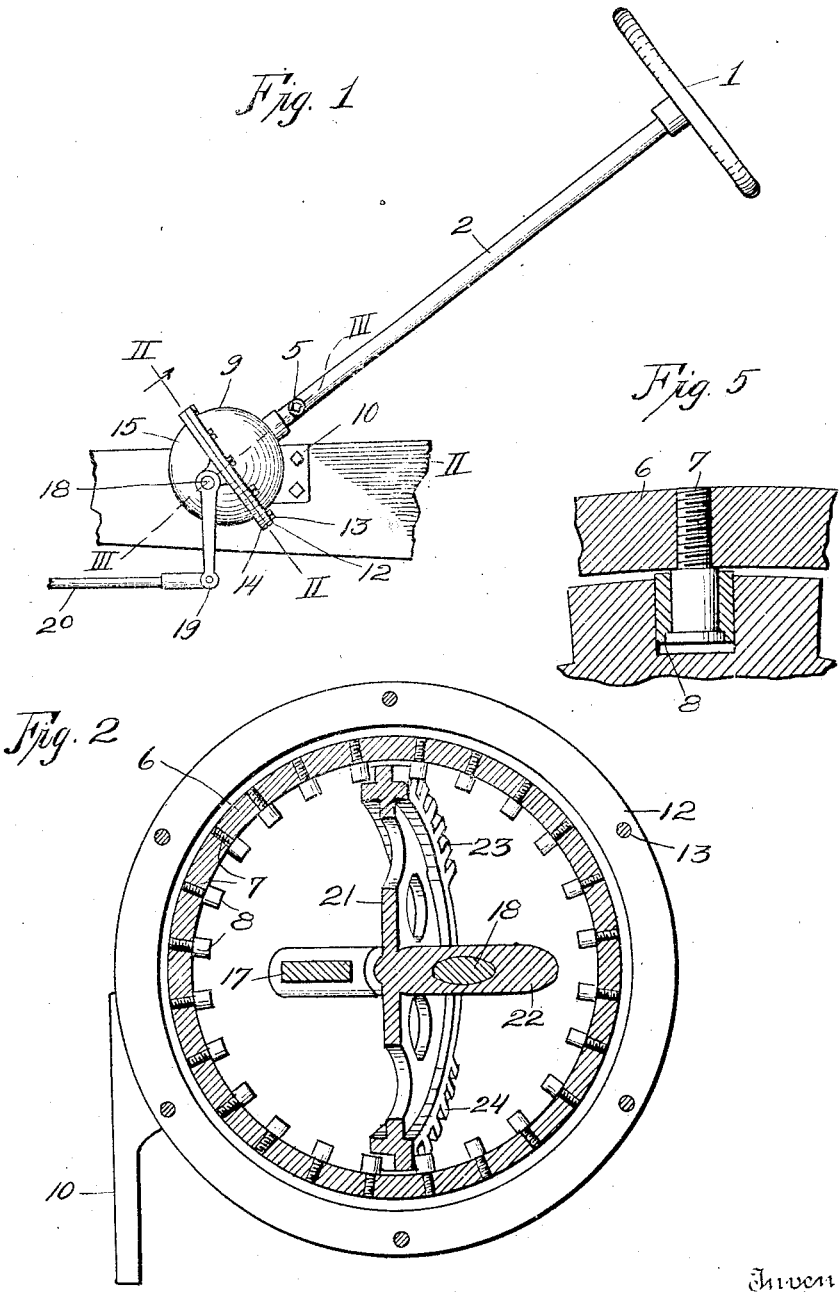

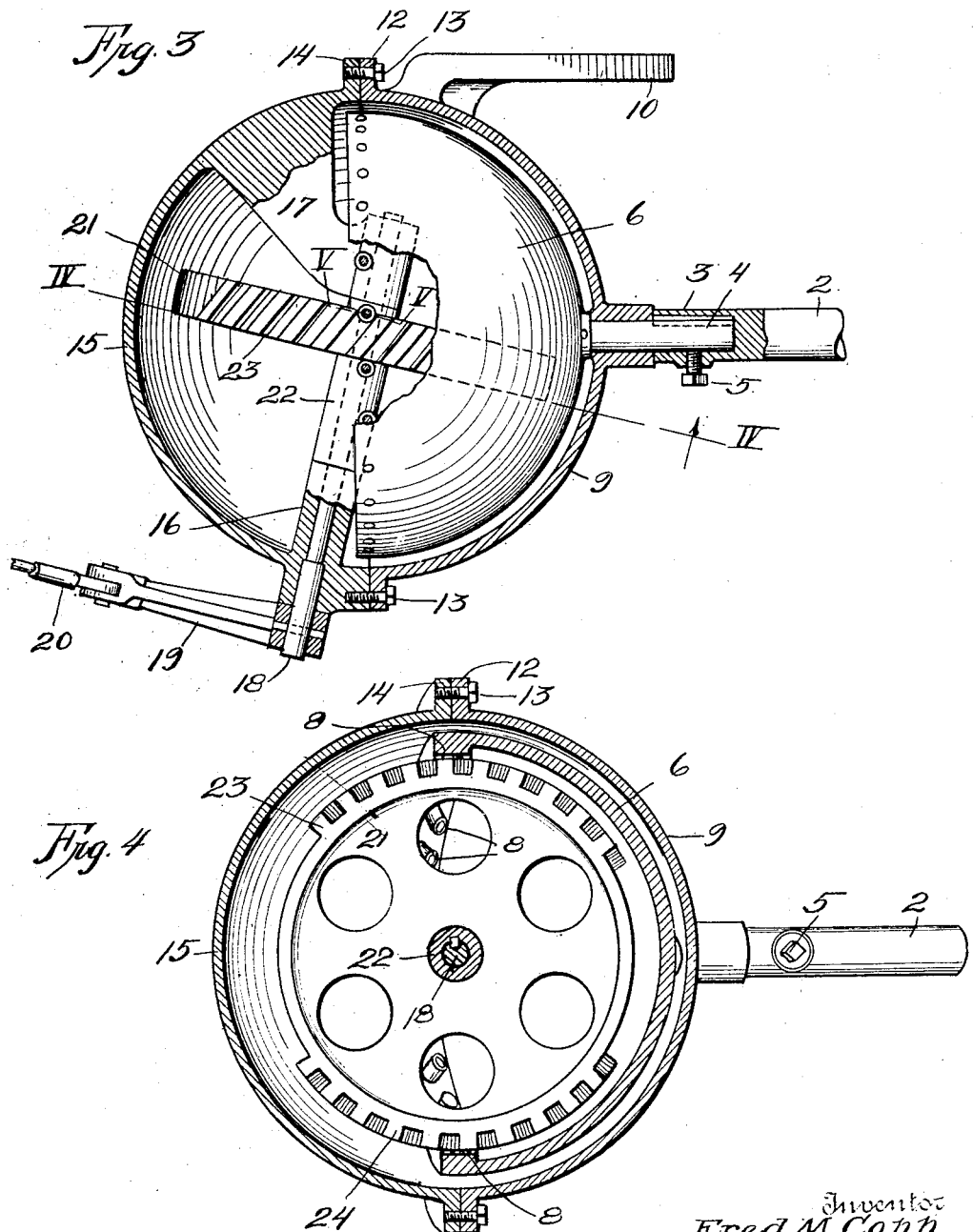

FRED M. COPP, OF KANSAS CITY, MISSOURI.

AUTOMOBILE STEERING-GEAR.

1,381,402.
Specification of Letters Patent. Patented June 14, 1921.

Application filed September 10, 1920. Serial No. 409,417.

*To all whom it may concern:*

Be it known that I, FRED M. COPP, citizen of the United States, and resident of Kansas City, county of Jackson, State of Missouri, have invented a certain new and useful Improvement in Automobile Steering-Gears, of which the following is a complete specification.

This invention relates to motor car steering gear of the irreversible type. All such gears now on the market, as far as my knowledge extends, employing intermeshing gears for transmitting power, have but a limited extent of engagement, usually the engagement does not exceed simultaneous meshing of about three teeth, and the engagement is at one side only of the axis of rotation of the respective wheels. With such construction, it is usually but a comparatively short time before the contacting surfaces wear to such extent that considerable lost motion is the result, and incidental to this there is a proportionate weakening of the connection which in some instances, has resulted in the breaking of such steering gear mechanism with disastrous results. My object is to produce a gearing which is irreversible in the sense such term is ordinarily employed in connection with motor cars, and in which the engaging gears are always interlocked together at diametrically opposite sides of their respective axes and thus give a double wearing service and a double strength to the connection. A still further object is to produce a steering gear which gives the operator of the steering wheel a greater leverage and consequently a more perfect control of the steering of the car, while retaining the steering mechanism in small and compact form.

With these general objects in view, the invention consists in certain novel and useful features of construction and combinations of parts as hereinafter described and claimed; and in order that it may be fully understood, reference is to be had to the accompanying drawings, in which:—

Figure 1 is a side elevation of a fragment of a motor car equipped with a steering mechanism embodying the invention.

Fig. 2 is an enlarged section taken on the line II—II of Fig. 1.

Fig. 3 is a section on the same scale as Fig. 2, but taken on the line III—III of Fig. 1, one of the members of the steering gear in the plane of said section, being shown in elevation and partly broken away; and the other member being shown in elevation.

Fig. 4 is a view on the same scale as Figs. 2 and 3, but in vertical section on the line IV—IV of Fig. 3.

Fig. 5 is a magnified fragmentary view showing the engagement of the two geared members of the mechanism.

In the said drawings, 1 indicates the steering wheel of a motor car, 2 the steering shaft thereof, (the posts for inclosing said shafts being omitted), and 3 a socket in the lower end of said shaft for receiving a stub shaft 4, the two shafts being fastened rigidly together as regards rotatable movement, and clamped together by set screw 5 to prevent endwise separation.

The shaft 4 projects axially from a hemispherical hollow wheel 6, provided with a circular series of internal teeth, comprising headed bolts 7 secured radially in the wheel, and anti-friction rollers 8 journaled on said bolts, the wheel and said teeth constituting a gear wheel as it is hereinafter termed.

Snugly incasing the gear wheel 6 is a member 9 of a spherical casing or housing, the member 9 being of a hemi-sperical form, and provided with a projecting arm or brackets 10, by which said housing member is bolted to the frame or an equivalent rigid part 11 of the car. The housing member 9 is provided with a marginal outwardly projecting perforated flange 12 secured by bolts 13 to a corresponding flange 14 of the complementary housing member 15, and the latter is provided with a pair of extensions or arms 16 and 17, constituting journal bearings for a shaft 18, which shaft projects from the housing and is equipped at its outer end with a crank arm 19, pivotally connected by a link 20 with the customary rod or the like, not shown, for turning the wheels preparatory to steering the car to the right or the left. It will be noted that the shaft 18 extends angularly with respect to the plane of the teeth of gear 6 and intersects the axis of said gear, and journaled on said shaft between said bearings 16 and 17 is a worm-gear 21, the hub 22 of the same bearing at its end respectively against the bearings 16 and 17 so that the worm-gear shall stand in the plane of the axis of gear 6.

The worm-gear 21 is provided peripherally with two sets of worm teeth 23 and 24 disposed at diametrically opposite points, the upper set 23 of said teeth engaging depending teeth of the gear 6, and the lower set 24 engaging underlying teeth of said gear 6, and it will also be understood that the teeth 23 and 24 extend at reverse angles to each other, so that rotation imparted to the gear 6 shall apply force on both sets of teeth for turning the gear 21 in the desired direction.

For convenience of illustration, the parts are so proportioned that no more than two of the teeth of gear 6 engage one set of the teeth 23 or 24 simultaneously, but it will be apparent that the parts may be so proportioned that two or more of the teeth of gear 6 may simultaneously engage one set of teeth on the gear 21, a corresponding relation of course, taking place at the opposite side of said gear. It will thus be seen that a long bearing, in effect, is established between the two gear wheels for the purpose of minimizing wear of the teeth thereof, and it will also be apparent that by applying pressure in opposite directions simultaneously on the wheel 21 at diametrically opposite sides, maximum force can be applied with a relatively small and compact construction.

From the above description, it will be apparent that I have produced a steering gear for motor cars embodying the features of advantage set forth as desirable, and which is obviously susceptible of modification without departing from the principle of construction involved or from the spirit and scope of the appended claims.

I claim:

1. A steering gear, comprising a shaft, an internal tooth gear wheel thereon, a second shaft, a wheel thereon provided at diametrically opposite points with two sets of external reversely-pitched worm teeth meshing with the said gear wheel and means to transmit power from the last named shaft.

2. A steering gear, comprising a shaft, an internal tooth gear wheel thereon, a second shaft, a wheel thereon provided at diametrically opposite points with two sets of external reversely-pitched worm teeth meshing with the said gear wheel, a crank arm on the said worm wheel shaft, and a steering wheel connected to turn the first-named shaft.

3. A steering gear, comprising a shaft, an internal tooth gear wheel thereon, a second shaft, a wheel thereon provided at diametrically opposite points with two sets of external reversely-pitched worm teeth meshing with the said gear wheel, a steering wheel connected to turn said first-named shaft, and means to transmit power from said second shaft.

4. A steering gear, comprising a spherical housing, a shaft journaled therein, an internal-tooth gear wheel on said shaft, a second shaft journaled in said housing and extending at an angle to the face of the said gear wheel, a wheel secured on said second shaft, provided at diametrically opposite points with two sets of external reversely-pitched worm teeth meshing with the said gear wheel, and a crank arm secured on said worm wheel shaft exterior to said housing.

5. A steering gear, comprising a housing consisting of two semi-spherical members bolted together, one of said members having a pair of alined bearings within the chamber of the housing, a shaft journaled in said bearings and intersecting the center of the housing, a wheel secured on said shaft in the plane of the axis of the housing and provided with two sets of reversely-pitched external worm teeth, a shaft extending radially into said housing, an internally toothed wheel secured on said shaft and engaging the teeth of said worm wheel, a steering wheel connected to said radially arranged shaft and means for transmitting power from the first named shaft.

In testimony whereof, I hereto affix my signature.

FRED M. COPP.